United States Patent [19]

Yamada et al.

[11] Patent Number: 4,663,423

[45] Date of Patent: May 5, 1987

[54] POLYESTER AND PROCESS FOR PREPARATION THEREOF

[75] Inventors: Hironori Yamada; Nobuo Sayama; Masashi Kuno, all of Matsuyama, Japan

[73] Assignee: Teijin Limited, Osaka, Japan

[21] Appl. No.: 723,367

[22] Filed: Apr. 15, 1985

[30] Foreign Application Priority Data

Apr. 16, 1984 [JP] Japan ................................ 59-75038

[51] Int. Cl.$^4$ ............................................ C08G 63/12
[52] U.S. Cl. .................................... 528/179; 528/176; 528/180
[58] Field of Search ..................... 528/176, 179, 180

[56] References Cited

U.S. PATENT DOCUMENTS

| | | | |
|---|---|---|---|
| 3,288,755 | 11/1966 | Griehl et al. | 528/180 |
| 3,804,805 | 4/1974 | Kuhfuss et al. | 528/176 X |
| 4,287,332 | 9/1981 | Jackson et al. | 528/176 |
| 4,415,726 | 11/1983 | Tanji et al. | |
| 4,429,104 | 1/1984 | Feasey | 528/176 X |
| 4,446,302 | 5/1984 | Sandhu et al. | 528/272 X |

FOREIGN PATENT DOCUMENTS 0034123 2/1982 Japan .
0042922 3/1982 Japan .

OTHER PUBLICATIONS

W. J. Jackson, Jr. et al., Liquid Crystal Polymers. I. Preparation and Properties of p-Hydroxybenzoic Acid Copolyesters, J. Polymer Science, 14, 2043-2058.

*Primary Examiner*—Lucille M. Phynes
*Attorney, Agent, or Firm*—Kenyon & Kenyon

[57] ABSTRACT

A polyester formed by adding compounds of the following formulae I and II to a reaction product of terephthalic acid or a dicarboxylic acid mixture mainly composed of terephthalic acid or an ester-forming derivative thereof with at least one glycol or an ester-forming derivative thereof, having a melt electrical resistance of not higher than $1600 \times 10^6$ $\Omega$ and a softening point higher than the softening point derived from Flory's equation for the melting temperature of random copolymers but lower than the softening point of a polyester obtained by adding a compound of formula I alone:

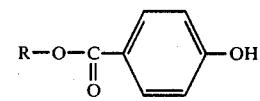

I

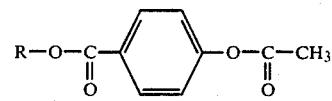

II wherein each R independently represents a hydrogen atom or an alkyl group having 1 or 2 carbon atoms.

9 Claims, 1 Drawing Figure

POLYESTER AND PROCESS FOR PREPARATION THEREOF

BACKGROUND OF THE INVENTION

1. Field of the Invention

The present invention relates to a polyester for a fiber or film, which is excellent in color and shapeability, such as spinnability or drawability, and also excellent in mechanical porperties such as strength and Young's modulus, and a process for the preparation thereof.

2. Description of the Related Art

Polyesters, especially polyethylene terephthalate, are used in various fields particularly as fibers and films, due to their many excellent properties.

These polyesters are ordinarily prepared by forming a glycol ester of terephthalic acid and/or a low polymer thereof by subjecting terephthalic acid and ethylene glycol to an esterification reaction, subjecting a dialkyl ester of terephthalic acid and ethylene glycol to an ester-exchange reaction or reacting terephthalic acid with ethylene oxide, and polycondensing the product by heating under reduced pressure until the degree of polymerization is elevated to a predetermined level.

A polyester prepared according to the above-mentioned process is extruded in the molten state through a spinning nozzle or a slit to form a fiber or film. The formed fiber or film is put into practical use. Furthermore, there is broadly adopted a method in which a preoriented yarn (POY) obtained by melt-spinning a polyester at a high speed exceeding 2,000 m/min is subjected to draw false twisting texturing.

Recently, there has been proposed a process in which a polyester is melt-spun at a high speed exceeding 5,000 m/min. A polyester fiber having sufficient properties for practical use is thus obtained only through the spinning step (see, for example, U.S. Pat. No. 4,415,726 to H. Tanji et al).

However, since an increase of the spinning speed, especially beyond 5,000 m/min, results in an increase of single filament breakage and yarn breakage, the obtained fiber has many defects, such as fluff, and the adaptability to subsequent processing operations is drastically degraded. This tendency becomes conspicuous as the spinning speed is increased, the single filament denier is reduced, and the filament number is increased. Accordingly, spinning at a speed exceeding 6,000 m/min is very difficult in practice.

In the field of fibers, along with the increasingly sophisticated treatments for improving the productivity and imparting various functional characteristics at the post-processing, spinning, and other steps, it has become strongly desired to improve the properties, especially the mechanical properties such as strength and Young's modulus, in both filaments and staple fibers of polyesters.

In the so-called direct yarn-forming process in which a polyester yarn ready for practical use is obtained by just the spinning step, it is necessary to increase the winding speed to at least 5,000 m/min. Even if the winding speed is increased to such a high level, the mechanical properties, such as strength and Young's modulus, of the polyester yarn obtained by the direct yarn-forming process are still lower than those of ordinary drawn yarns.

Moreover, at this high-speed spinning step, yarn breakage is frequently caused. Therefore, the process can not be realized effectively on an industrial scale.

One of us made research with a view to eliminating the foregoing disadvantages. As a result, it was found that a polyester formed by adding 0.01 to 1.5 mole % of p-hydroxybenzoic acid (often referred to as "POBA" hereinafter) to a bifunctional carboxylic acid or an ester-forming derivative thereof has a good color and, when this polyester is subjected to high-speed spinning, yarn breakage can be reduced at the spinning step and the strength and Young's modulus of the obtained fiber are highly improved. This process was already proposed in the specifications of Japanese Patent Applications No. 55-107753 and No. 55-116978.

A polyester formed by adding a small amount of POBA is excellent in adaptability to high-speed spinning over ordinary polyesters and the mechanical properties of the obtained fiber are improved. However, the mechanical properties are still insufficient from a practical viewpoint. It is desired to further improve the mechanical properties.

SUMMARY OF THE INVENTION

Figure 1:
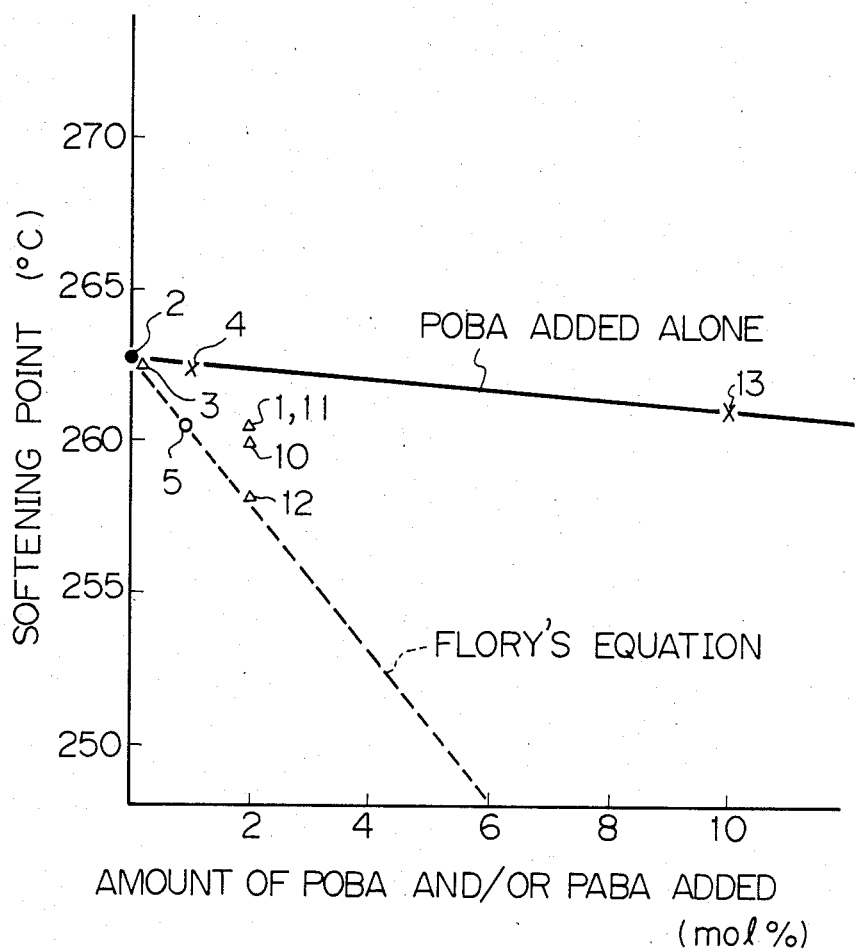
FIG. 1 is a graph illustrating the relationship between the softening point of a polyester added with POBA and/or PABA and the amount of POBA and/or PABA added.

It is a primary object of the present invention to provide a polyester which is excellent in color and in which the high-speed spinnability and the mechanical properties of a fiber obtained by high-speed spinning of the polyester are increased to a sufficient level for practical use, and a process for the production of this polyester.

The above-mentioned object of the present invention can be attained by a polyester obtained by adding POBA and p-acetoxybenzoic acid (often referred to as "PABA" hereinafter) having a low melt electrical resistance and having a break-resistant bonding group incorporated in the polyester molecular chain.

Thus, the present invention provides a polyester formed by adding compounds of the following formulae I and II to a reaction product of terephthalic acid or a dicarboxylic acid mixture mainly composed of terephthalic acid or an ester-forming derivative thereof with at least one glycol or an ester-forming derivative thereof, having a melt electrical resistance of not higher than $1600 \times 10^6$ Ω and a softening point higher than the softening point derived from Flory's equation for the melting temperature of random copolymers but lower than the softening point of a polyester obtained by adding a compound of formula I alone:

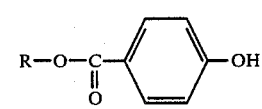

I

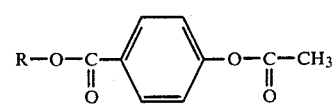

II wherein each R independently represents a hydrogen atom or an alkyl group having 1 or 2 carbon atoms.

DESCRIPTION OF THE PREFERRED EMBODIMENTS

We made research on a polyester obtained by adding POBA alone and found that a polyester obtained by adding POBA after the completion of the transesterification or esterification has a lower melt electrical resistance and higher spinnability than a polyester obtained without adding POBA. We further found that where POBA is added after the completion of the transesterification or esterification, since a break-resistant bonding group:

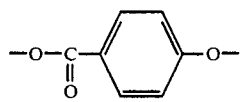

which is the residue of POBA, cannot be incorporated in the polyester molecular chain, it is difficult to obtain a fibrous yarn of improved properties such as strength or Young's modulus.

We thus considered that if a break-resistant bonding group such as the residue of POBA is incorporated in the polyester molecular chain of a polyester added with POBA, a fibrous yarn of an improved strength and Young's modulus can be obtained. Therefore, we made research on a polyester to be obtained by adding PABA having a higher reactivity to a polyester oligomer than POBA together with POBA and found that such a polyester has an improved spinnability, as compared with an ordinary polyester, due to the break-resistant bonding group incorporated in the polyester molecular chain and, thus, a fibrous yarn obtained from the polyester has a highly improved strength and Young's modulus.

As the compound represented by formula I, there can be mentioned p-hydroxybenzoic acid, methyl p-hydroxybenzoate, and ethyl p-hydroxybenzoate. As the compound represented by formula II, there can be mentioned p-acetoxybenzoic acid, methyl p-acetoxybenzoate, and ethyl p-acetoxybenzoate.

If one of the compounds of formulae I and II is not added, the obtained polyester has a lower spinnability as compared with a polyester obtained by adding both the compounds I and II, providing a fibrous yarn of a relatively low strength and Young's modulus.

In the present invention, the melt electrical resistance of the polyester should be not higher than $1600 \times 10^6 \, \Omega$, preferably from $100 \times 10^6 \, \Omega$ to $1600 \times 10^6 \, \Omega$. Further, the polyester should have a softening point higher than the softening point derived from Flory's equation for the melting temperature of random copolymers but lower than the softening point of a polyester obtained by adding a compound of formula I alone. If the melt electrical resistance is higher than $1600 \times 10^6 \, \Omega$ (i.e., 1600 MΩ) or the softening point does not fall within the above-mentioned range, the obtained polyester often has a deteriorated color and yarn breakage often occurs during the high-speed spinning of the polyester. Further, the obtained polyester fibers do not have a strength sufficient for practical use.

Flory's equation is represented as follows [see, J. Chem. Phys., 17, 223 (1949)]:

$$\frac{1}{Tm} - \frac{1}{Tn^\circ} = -\left(\frac{R}{\Delta Hu}\right) \ln P$$

in which ΔHu is 2200 cal/mol as determined by O. B. Edgar and R. Hill see, J. Polymer Science, 8, 1(1952).

The "softening point of a polyester obtained by adding p-hydroxybenzoic acid alone" as used herein refers to a softening point of a polyester obtained by adding an equivalent amount of a compound of formula I instead of the compounds of formulae I and II in the process of the present invention as hereinafter described.

The melt electrical resistance may be measured as follows. A test tube is charged with 20 g of a sample polymer, and the electrical resistance is measured at 290° C. in a nitrogen atmosphere for 10 minutes by a resistance meter of 1 to 2000 MΩ. SUS 304 stainless steel plates having a length of 10 mm, a width of 10 mm, and a thickness of 0.5 mm are used as electrodes, and the interelectrode distance is 10.5 mm.

In order to prepare a polyester as mentioned above, it is indispensable that at an arbitrary stage during the period from the terminal stage of the esterification or transesterification to the middle stage of the polycondensation, 0.1 to 20 mole %, preferably 1 to 5 mole %, of a compound of the above-mentioned formula I and 0.1 to 20 mole %, preferably 1 to 5 mole %, of a compound of the above-mentioned formula II be added to the dicarboxylic acid component.

Thus, the present invention also provides a process for preparing a polyester comprising subjecting to polycondensation a reaction product obtained by the esterification or transesterification of terephthalic acid or a dicarboxylic acid mixture mainly composed of terephthalic acid or an ester-forming derivative thereof with at least one glycol or an ester-forming derivative thereof, wherein at an arbitrary stage during the period from the terminal stage of the esterification or transesterification to the middle stage of the polycondensation, 0.81 to 20 mole % of a compound of formula I and 0.1 to 20 mole % of a compound of formula II are added to the dicarboxylic acid or ester-forming derivative thereof.

If the amount of the compound of formula I is less than 0.1 mole %, the resulting polyester has a melt electrical resistance of higher than 1600 MΩ, while if the amount exceeds 20 mole %, the spinnability of the resulting polyester and the mechanical properties of the resulting fibrous yarn are not further improved and the cost of the preparation of the polyester becomes high.

If the amount of the compound of formula II is less than 0.1 mole % or more than 20 mole %, a polyester having a softening point falling within the range as defined above cannot be obtained.

In the present invention, it is indispensable that these compounds be added during the period from the terminal stage of the esterification or transesterification to the middle stage of the polycondensation.

If these compounds are added at the middle stage or earlier stage of the esterification or transesterification, it is impossible to attain the melt electrical resistance of not higher than 1600 MΩ. If these compounds are added at the later stage of the polycondensation, it is impossible to obtain a polyester having a desired softening point.

In the present invention, it is preferred that the compound represented by formulae I and II be added together with a polycondensation reaction catalyst after completion of the esterification or transesterification.

These compounds may be added directly or after they are dispersed or dissolved in an appropriate solvent such as glycol.

The terminal stage of the esterification or transesterification, referred to in the present invention, means the stage in which the esterification ratio or transesterification ratio in the reaction product is at least 99%. The middle stage of the polycondensation reaction means the stage before the intrinsic viscosity of the reaction product, as measured at 30° C. in o-chlorophenol as the solvent, reaches 0.3.

Thus, a polyester having a melt electrical resistance and softening point as defined above can easily be obtained with a low cost by adding POBA and PABA in amounts specified in the present invention at a stage specified in the present invention.

A polyester copolymerized with 10 to 15 mole % of POBA is known, but the polyester has a melt electrical resistance of higher than 1600 MΩ.

The reason is that since POBA is ordinarily added to starting materials to be subjected to the esterification or transesterification and is copolymerized, the OH group of POBA reacts with the glycol and is readily converted to a bonding group:

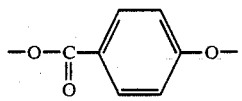

in the polyester molecular chain. The resulting polyester has, however, a melt electrical resistance as high as that of an ordinary polyester.

If POBA is added at the terminal stage of the esterification or transestrification, the resulting polyester has a low melt electrical resistance but the improvement in the mechanical properties of the resulting polyester is not so remarkable. The reason may be that the reaction of the OH group of POBA with the glycol is somewhat restrained and, thus, the POBA component is retained in the polymer, without being copolymerized with the polyester, in a state bonded to the ends of the molecular chain or in a free state.

Contrary to POBA having the above-mentioned characteristics, PABA can easily introduce the above-mentioned connecting groups into the molecule chain of the polyester even if it is added at the terminal stage of the esterification or transesterification.

In the present invention, by utilizing the above-mentioned characteristics of POBA and PABA, there can easily be obtained a polyester having a low melt electrical resistance, in which bonding groups:

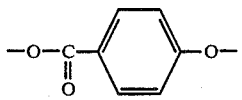

are present in the molecular chain.

In principle, the polyester referred to in the present invention is polyethylene terephthalate consisting of terephthalic acid component and an ethylene glycol component. However, a polyester in which a part (ordinarily up to 15 mole %, preferably up to 10 mole %) of the terephthalic acid component is replaced with other bifunctional carboxylic acid components or a polyester in which a part (ordinarily up to 15 mole %, preferably up to 10 mole %) of the ethylene glycol component is replaced with other diol components may be used. Furthermore, various additives such as a dyeing assistant, a flame retardant, an antistatic agent, a hydrophilic agent, and a colorant may be incorporated by copolymerization or mixing.

This polyester is ordinarily prepared by subjecting terephthalic acid and ethylene glycol to esterification, subjecting a lower alkyl ester of terephthalic acid, such as dimethyl terephthalate, and ethylene glycol to transesterification or reacting terephthalic acid with ethylene oxide to form a glycol ester of terephthalic acid and/or a lower polymer thereof, and heating the product under reduced pressure to effect polycondensation until a predetermined degree of polymerization is attained.

Optional catalysts may be used for these reactions according to need. Above all, when the transesterification process is adopted, a calcium compound, a manganese compound, a magnesium compound, a zinc compound, or a cobalt compound is preferably used as the transesterification catalyst. Two or more of these compounds may be used in combination. It is preferred that the transesterification catalyst be used in an amount of 0.01 to 0.1 mole % based on the bifunctional carboxylic acid component used.

An antimony compound, a titanium compound, or a germanium compound is preferably used as the polycondensation catalyst. Two or more of these compounds may be used in combination. It is preferred that the polycondensation catalyst be used in an amount of 0.003 to 0.1 mole % based on the bifunctional carboxylic acid component. In case of an antimony compound, it is especially preferred that the antimony compound be used in an amount of 0.015 to 0.05 mole %.

In the present invention, a phosphorus compound can be used as a stabilizer. Use of this stabilizer is preferred. Any of the phosphorus compounds customarily used as stabilizers for polyesters can be used in the present invention. Of these phosphorus compounds, phosphoric acid, phosphorus acid, and mono-, di-, and tri-esters thereof are preferred. As the ester, there are preferably used alkyl esters having 1 to 6 carbon atoms and a phenyl ester. Moreover, a product obtained by heating such an alkyl ester in glycol, especially ethylene glycol, is preferably used. It is preferred that the phosphorus compound be used in an amount of 0.001 to 0.5 mole % based on the bifunctional carboxylic acid component used. It also is preferred that the phosphorus compound be added when the reaction of the first stage is substantially completed. The method of the addition of the phosphorus compound is not particularly critical. Namely, the phosphorus compound may be added as it is or after it is dispersed or dissolved in glycol, especially the same glycol as the glycol used for the production of the polyester.

In the present invention, by adding the compound represented by formula II during the period from the terminal stage of the esterification or transesterification to the middle stage of the polycondensation, bonding groups:

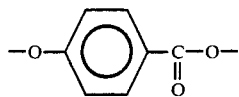

can be made present in the molecule chain of the polyester. By this copolymerization, crystallization can be controlled at the molecular orientation of the polyester and occurrence of breakage is prevented at high-speed spinning. Moreover, by introduction of these break resistant groups:

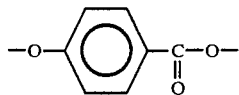

by copolymerization, the mechanical properties such as strength and Young's modulus can be improved. However, as in case of ordinary copolymerization of polyesters, the polymer copolymerized with the compound of formula II is degraded in the heat resistance and the color of the polymer is bad.

By adding the compound of formula I during the period from the terminal stage of the esterification or transesterification to the middle stage of the polycondensation, there can be obtained a polyester having a low melt electrical resistance. Thus, crystallization of the polyester can be controlled at the molecular orientation, and occurrence of fiber breakage can be reduced at high-speed spinning. Moreover, by interaction between the compound of formula I and the catalyst used for the preparation of the polyester, there can be attained effects of improved the heat resistance of the polyester and color of the polyester.

Accordingly, by using the compounds represented by formulae I and II in combination, the defects of both the compounds are eliminated and the effects attained by both the compounds are synergistically enhanced.

Furthermore, even when the polyester of the present invention is applied to uses other than high-speed spinning, for example, the spinning-drawing method, a good drawability is attained and the mechanical properties of the obtained drawn yarn are improved. Moreover, when the polyester of the present invention is used for the production of a film, there can be obtained a film having improved mechanical properties.

According to the present invention, there can be obtained a polyester which is excellent in color and spinnability and drawability and which provides a fiber or film excellent in mechanical properties such as strength and Young's modulus.

The present invention will now be described in detail with reference to the following examples. In the examples, all of "parts" are by weight, and [η] indicates the intrinsic viscosity determined from the value measured at 30° C. in o-chlorophenol as the solvent. The values L and b indicating the color of the polymer are those as measured by using a Hunter color difference meter. A larger value L indicates a more improved whiteness and a larger value b indicates a stronger yellowness. Namely, when the value L is large and the value b is small, the polyester has a good color.

(Drawn Yarn)

The polymer is extruded at a rate of 80 g/min at 285° C. from a spinneret having 30 spinning nozzles having a diameter of 0.3 mm and melt-spun at a spinning speed of 1200 m/min.

The obtained undrawn yarn is drawn at a drawing temperature of 85° C., a draw ratio of 3.5, and a drawing speed of 1100 m/min to wind 2.5 kg of a 150 denier/30 filaments yarn on a bobbin. The ratio of the number of spindles on which winding of single filaments takes place to 100 spindles is shown as the wrap ratio (%) in Table 1. Furthermore, the strength and Young's modulus of the obtained drawn yarn are shown in Table 1.

(High-Speed Spun Yarn)

The same polymer (about 2 tons) is extruded at a rate of 31 g/min at 290° C. from a spinneret having 24 spinning nozzles having a diameter of 0.3 mm and melt-spun at a spinning speed of 5500 m/min. The frequency of occurrence of breakage during the spinning and the number of fluffs in the obtained polyester fiber are examined.

The frequency of occurrence of breakage is expressed in terms of the frequency per ton of the extruded polyester. The number of fluffs in the polyester fiber is counted by a photoelectric tube, and the number of fluffs per 1,000,000 m is shown.

The strength and Young's modulus of the obtained yarn are simultaneously shown in Table 1.

(Film)

An undrawn film is prepared by extruding the same polyester at an extrusion temperature of 285° C., and a biaxially drawn film is prepared by biaxially drawing the undrawn film at a longitudinal draw ratio of 3.5 and a lateral draw ratio of 4.0 at a film-forming speed of 150 m/min. The Young's modulus and strength of the obtained film are measured. The obtained results are shown in Table 1.

The concentration of the bonding groups:

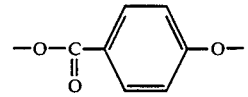

referred to in the examples is estimated from Flory's equation for the melting temperature of random copolymers on the basis of the softening point of the polyester and is designated in equivalent per $10^6$ g.

EXAMPLE 1

A mixture of 970 parts of dimethyl terephthalate, 640 parts of ethylene glycol, and 0.31 part (25 millimole % based on dimethyl terephthalate) of manganese acetate as an ester-exchange catalyst was stirred and then charged into a reaction vessel equipped with a rectifying column and a methanol-distilling condenser. The mixture was heated at 140° C. to 230° C. and the transesterification was carried out while removing methanol formed by the reaction from the reaction system. When the reaction was conducted for 3 hours, the inner temperature was 230° C. During this reaction, 3.20 parts of methanol was distilled. At this point, 0.22 part (30 millimole % based on dimethyl terephthalate) of trimethyl phosphate was added as a stabilizer. After the reaction was further conducted for 10 minutes, 0.44 part (30 millimole % based on dimethyl terephthalate) of antimony trioxide was added as a polycondensation catalyst and p-acetoxybenzoic acid was added in an amount shown in Table 1. After 5 minutes, p-hydroxybenzoic acid was added in an amount shown in Table 1 and the ester-exchange reaction was completed. Then, the obtained reaction product was transferred into a polycondensation reaction vessel equipped with a stirrer and a glycol condenser, and the temperature was gradually elevated from 230° C. to 285° C. Simultaneously, the pressure was reduced from atmospheric pressure to a high vacuum of 1 mmHg. In this state, the polycondensation was carried out to obtain a polymer having [η] of 0.63. The properties of the obtained polymer and the melt electrical resistance and the concentration of bonding groups

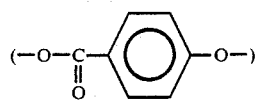

are shown in Table 1.

glycol. The esterification was carried out at 220° C. to 260° C. for 3 hours under compression of 3 kg/cm$^2$G by $N_2$ while distilling water generated by the reaction. A preliminarily formed slurry of titanium dioxide in ethylene glycol was added in an amount of 0.3% by weight based on the polyester. When about 180 parts of water was distilled, 0.04 part (5 millimole % based on terephthalic acid) was added as a stabilizer. After 10 minutes, 0.45 part (30 millimole % based on terephthalic acid) of antimony trioxide and 1.0 mole %, based on terephthalic acid, of p-acetoxybenzoic acid (PABA) were added. After 5 minutes, 1.0 mole %, based on terephthalic acid, of p-hydroxybenzoic acid (POBA) was added, and the esterification reaction was completed. Then, the polycondensation reaction was carried out in the same manner as described in Example 1 to obtain pellets of polyethylene terephthalate.

Evaluation was carried out in the same manner as described in Example 1. The obtained results are shown in "Run No. 12" of Table 2.

For comparison, a polymer was prepared in the same manner as described in Example 3 except that a solution of 10 mole % of p-hydroxybenzoic acid (POBA) in ethylene glycol was added at the start of the esterification reaction and PABA and POBA were not added at the termination of the esterification reaction. Evaluation was carried out in the same manner as described in Example 2.

The obtained results are shown in "Run No. 13" of Table 2.

TABLE 1

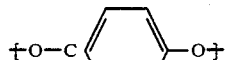

| Run No. | POBA (mole %) | PABA (mole %) | [η] | Softening point (°C.) | L | b | Electrical resistance (MΩ) of melt | (eg/10$^6$ g) | Draw wrap ratio (%) | Strength (g/de) | Young's modulus (kg/mm$^2$) |
|---|---|---|---|---|---|---|---|---|---|---|---|
| 1 | 1.0 | 1.0 | 0.63 | 260.5 | 68.1 | 0.1 | 300 | 52 | 0.6 | 4.6 | 1300 |
| *2 | 0 | 0 | 0.64 | 262.7 | 66.8 | 1.0 | 2000 | 0 | 1.2 | 4.1 | 1100 |
| 3 | 0.1 | 0.1 | 0.63 | 262.5 | 67.3 | 0.5 | 1600 | 3 | 0.8 | 4.3 | 1250 |
| *4 | 1.0 | 0 | 0.63 | 262.3 | 67.8 | 0.3 | 300 | 0 | 1.1 | 4.1 | 1200 |
| *5 | 0 | 1.0 | 0.63 | 260.5 | 65.5 | 1.8 | 2000 | 52 | 1.3 | 4.2 | 1200 |
| 6 | 20 | 1.0 | 0.62 | 250.3 | 68.0 | 0.3 | 100 | 52 | 0.9 | 4.6 | 1300 |
| 7 | 1.0 | 20 | 0.61 | 240.3 | 66.7 | 0.2 | 300 | 996 | 0.8 | 4.5 | 1300 |
| *8 | 1.0 | 20.5 | 0.61 | 236.3 | 65.9 | 1.0 | 300 | 1006 | 1.2 | 4.2 | 1150 |
| *9 | 20.5 | 1.0 | 0.61 | 246.3 | 68.3 | 0.5 | 100 | 52 | 1.4 | 4.2 | 1200 |

| Run No. | Frequency (time/ton) of occurence of breaking at spinning | Number of fluffs per 10$^6$ m | Strength (g/de) | Young's modulus (kg/mm$^2$) | Film Strength (kg/mm$^2$) | Film Young's modulus (kg/mm$^2$) |
|---|---|---|---|---|---|---|
| 1 | 13 | 0.3 | 4.3 | 1050 | 33 | 620 |
| *2 | 76 | 3.0 | 3.6 | 760 | 26 | 520 |
| 3 | 48 | 0.9 | 4.2 | 960 | 32 | 600 |
| *4 | 62 | 2.1 | 4.0 | 820 | 28 | 540 |
| *5 | 49 | 2.2 | 4.1 | 920 | 30 | 580 |
| 6 | 23 | 0.7 | 4.6 | 1000 | 34 | 600 |
| 7 | 28 | 0.8 | 4.5 | 960 | 33 | 600 |
| *8 | 60 | 2.0 | 4.0 | 850 | 30 | 550 |
| *9 | 50 | 2.0 | 4.1 | 900 | 32 | 550 |

*Comparative example

EXAMPLE 2

A polymer was obtained in the same manner as described in Example 1, except that 1 mole % of p-hydroxybenzoic acid (POBA) and/or 1 mole % of p-acetoxybenzoic acid (PABA) was added at a stage shown in Table 2. The obtained results are shown in Table 2.

EXAMPLE 3

A pressure-resistant autoclave was charged with 860 parts of terephthalic acid and 390 parts of ethylene

TABLE 2

| | | | | | | | Drawability | | |
| Run | POBA (mole | PABA (mole | Time of | Softening | Electrical resistance | | Draw wrap | Strength | Young's modulus (kg/ |

TABLE 2-continued

| No. | %) | %) | addition | [η] | point | L | b | (MΩ) of melt | (eg/10⁶ g) | ratio | (g/de) | mm² |
|---|---|---|---|---|---|---|---|---|---|---|---|---|
| *10 | 1 | 1 | dissolved in starting ethylene glycol | 0.62 | 260.0 | 68.2 | 1.0 | 2000 | 52 | 1.1 | 4.0 | 1150 |
| 11 | 1 | 1 | initial stage of polycondensation (η = 0.2) | 0.64 | 260.5 | 69.3 | 0.4 | 300 | 50 | 0.4 | 4.4 | 1300 |
| 12 | 1.0 | 1.0 | | 0.64 | 258.2 | 69.1 | −0.2 | 300 | 52 | 0.7 | 4.5 | 1260 |
| *13 | 10 | — | dissolved in starting ethylene glycol | 0.60 | 261.0 | 68.6 | 0.9 | 2000 | 510 | 1.0 | 4.0 | 1100 |

| | High-speed spun yarn | | | | Film | |
|---|---|---|---|---|---|---|
| Run No. | Frequency (time/ton) of occurence of breaking at spinning | Number of fluffs per 10⁶ m | Strength (g/de) | Young's modulus (kg/mm²) | Strength (kg/mm²) | Young's modulus (kg/mm²) |
| *10 | 53 | 1.9 | 4.0 | 850 | 26 | 500 |
| 11 | 14 | 0.8 | 4.5 | 1100 | 33 | 600 |
| 12 | 20 | 0.8 | 4.3 | 1000 | 33 | 580 |
| *13 | 43 | 1.2 | 4.1 | 950 | 28 | 550 |

*Comparative example

The relationship between the softening point of a polyester added with POBA and/or PABA and the amount of POBA and/or PABA added is illustrated in FIG. 1. In the drawing, the softening points measured for the polymers obtained in the examples are plotted together with their run number. In the drawing, the relationship obtained from the hereinbefore mentioned Flory's equation is also given.

We claim:

1. A polyester for forming fiber or film, the polyester comprising ethylene terephthalate units as the main recurring units, being formed by adding compounds of the following formulae I and II, respectively, in an amount of not more than 20 mole % with respect to the terephthalic acid component during the production of the polyester, having a melt electrical resistance of not higher than $1600 \times 10^6$ Ω and a softening point higher than the softening point of polyethylene terephthalate derived from Flory's equation for the melting temperature of random copolymers but lower than the softening point of a polyester obtained by adding a compound of formula I alone:

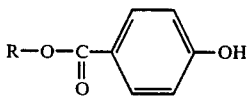

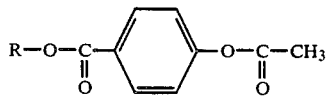

wherein each R independently represents a hydrogen atom or an alkyl group having 1 or 2 carbon atoms.

2. A polyester as set forth in claim 1, wherein the compound of formula I is p-hydroxybenzoic acid.

3. A polyester as set forth in claim 1, wherein the compound of formula II is p-acetoxybenzoic acid.

4. A polyester as set forth in claim 1, wherein the melt electrical resistance is $100 \times 10^6$ Ω to $1600 \times 10^6$ Ω.

5. A process for preparing a polyester for forming fiber or film, the process comprising subjecting to polycondensation a reaction product obtained by the esterification or transesterification of an acid component mainly composed of teraphthalic acid or an ester-forming derivative thereof with a glycol component mainly composed of ehtylene glycol, wherein at an arbitrary stage during the period from the terminal stage of the esterification or transesterification to the middle stage of the polycondensation, 0.1 to 20 mole % of a compound of formula I and 0.1 to 20 mole % of a compound of formula II,

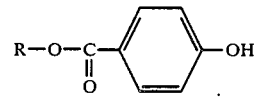

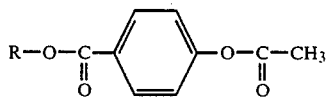

wherein each R independently represents a hydrogen atom or an alkyl group having 1 or 2 carbon atoms, are added to the terephthalic acid or ester-forming derivative thereof.

6. A process as set forth in claim 5, wherein the compound of formula I is p-hydroxybenzoic acid.

·7. A process as set forth in claim 5, wherein the compound of formula II is p-acetoxybenzoic acid.

8. A process as set forth in claim 5, wherein the terminal stage of the esterification or transesterification is a stage where the conversion to said reaction product is at least 99%.

9. A process as set forth in claim 5, wherein the middle stage of the polycondensation is a stage before the point when the intrinsic viscosity of the polycondensation product, as measured at 30° C. in o-chlorophenyl, reaches 0.3.

* * * * *